(12) United States Patent
Xu

(10) Patent No.: US 11,998,839 B2
(45) Date of Patent: Jun. 4, 2024

(54) INFORMATION PROCESSING METHOD, APPARATUS AND COMPUTER STORAGE MEDIUM

(71) Applicant: NETEASE (HANGZHOU) NETWORK CO., LTD., Hangzhou (CN)

(72) Inventor: Xing Xu, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 94 days.

(21) Appl. No.: 17/053,917

(22) PCT Filed: Nov. 26, 2019

(86) PCT No.: PCT/CN2019/121059
§ 371 (c)(1),
(2) Date: Nov. 9, 2020

(87) PCT Pub. No.: WO2021/012557
PCT Pub. Date: Jan. 28, 2021

(65) Prior Publication Data
US 2023/0338835 A1    Oct. 26, 2023

(30) Foreign Application Priority Data

Jul. 23, 2019 (CN) .......................... 201910667496.0

(51) Int. Cl.
*A63F 13/35* (2014.01)
*A63F 13/56* (2014.01)

(52) U.S. Cl.
CPC .............. *A63F 13/35* (2014.09); *A63F 13/56* (2014.09)

(58) Field of Classification Search
None
See application file for complete search history.

(56) References Cited

U.S. PATENT DOCUMENTS

| 8,856,310 | B2 | 10/2014 | Norden |
| 11,305,189 | B2 * | 4/2022 | Taka ....................... A63F 13/56 |

(Continued)

FOREIGN PATENT DOCUMENTS

| CN | 1893347 A | 1/2007 |
| CN | 101071515 A | 11/2007 |

(Continued)

OTHER PUBLICATIONS

Examples of Hacker Battles and Technical Analysis, Xiao Qingliang, p. 92-94, Home Computer World Press, Dec. 2004.

(Continued)

*Primary Examiner* — Ronald Laneau
(74) *Attorney, Agent, or Firm* — Qinghong Xu

(57) ABSTRACT

The embodiments of the present disclosure provide an information processing method, which includes receiving, by a game server, an operation message sent by a first client, the operation message carries location information corresponding to a start point and an end point of an attack operation; sending, by the game server, the location information to at least one second client, determining, by each of the at least one second client, whether there is an obstacle between the start point and the end point of the attack operation, and sending a corresponding determination result to the game server, wherein each of the at least one second client is a client that participates in a same session of a game with the first client; judging, by the game server, validity of the attack operation triggered by the first client, according to determination results.

15 Claims, 6 Drawing Sheets

(56) References Cited

U.S. PATENT DOCUMENTS

| | | | |
|---|---|---|---|
| 2010/0323794 A1 | 12/2010 | Su | |
| 2014/0287826 A1 | 9/2014 | Zhao et al. | |
| 2018/0104591 A1* | 4/2018 | Fukuda | G06F 3/0488 |
| 2019/0030429 A1* | 1/2019 | Nishikawa | A63F 13/56 |

FOREIGN PATENT DOCUMENTS

| | | |
|---|---|---|
| CN | 102509317 A | 6/2012 |
| CN | 103840979 A | 6/2014 |
| CN | 105469424 A | 4/2016 |
| CN | 106898051 A | 6/2017 |
| CN | 106955493 A | 7/2017 |
| CN | 107308645 A | 11/2017 |
| CN | 108629180 A | 10/2018 |
| CN | 109045702 A | 12/2018 |
| CN | 109893856 A | 6/2019 |
| KR | 20120086898 A | 8/2012 |

OTHER PUBLICATIONS

The ISR issued Apr. 22, 2020 by the WIPO.
The CN1OA issued Aug. 17, 2020 by the CNIPA.
Jouni Smed / Harri Hakonen, computer game algorithmic & networking, first edition, Bourne digital, Oct. 25, 2007, p. 189-190, ISBN 978-4-86246-050-9.
The 1st Office Action dated Nov. 16, 2021 for JP patent No. 2020-551564.

* cited by examiner

INFORMATION PROCESSING METHOD, APPARATUS AND COMPUTER STORAGE MEDIUM

CROSS-REFERENCE TO RELATED APPLICATIONS

The present application is the 371 application of PCT Application No. PCT/CN2019/121059, filed on Nov. 26, 2019, which claims the priority to Chinese Patent Application No. 201910667496.0, entitled "Information processing method, apparatus and storage medium", filed on Jul. 23, 2019, the entirety of which are incorporated by REFERENCE

Technical Field

Embodiments of the present disclosure relate to network games and in particular to an information processing method, apparatus, and storage medium.

BACKGROUND

In online games, a tag-on service generally refers to a cheating program that benefits players by modifying online games, that is, a cheating program that can be got by using computer technology to change a part of programs in one or more softwares. For example, under normal circumstances, when there is an obstacle between virtual characters controlled by player A and player B, the two virtual characters are invisible to each other and cannot attack each other: but when player A uses a tag-on service, functions of the tag-on service remove all obstacles, and a virtual character controlled by player A can see a virtual character corresponding to player B. Therefore, in order to ensure the fairness of online games, it is necessary for the client to judge validity of the attack operation, so as to prevent the use of tag-on services in actual applications.

It should be noted that the information disclosed in the Background section above is merely for enhancing understanding of the background of the present disclosure, and thus may comprise information that does not constitute prior art known to those of ordinary skill in the art.

SUMMARY

According to a first aspect of the present disclosure, an information processing method is provided, the method includes receiving, by a game server, an operation message sent by a first client, the operation message carries location information corresponding to a start point and an end point of an attack operation, and the first client is a client that triggers the attack operation: sending, by the game server, the location information corresponding to the start point and the end point of the attack operation to at least one second client, determining, by each of the at least one second client, whether there is an obstacle between the start point and the end point of the attack operation, and sending a corresponding determination result to the game server, wherein each of the at least one second client is a client that participates in a same session of a game with the first client; judging, by the game server, validity of the attack operation triggered by the first client, according to determination results.

According to a second aspect of the present disclosure, an information processing method is provided, the method includes sending, by a first client, an operation message to a game server, wherein the operation message carries location information corresponding to a start point and an end point of an attack operation, the first client is a client that triggers the attack operation; sending, by the game server, the location information corresponding to the start point and the end point of the attack operation to at least one second client: determining, by each of the at least one second client, whether there is an obstacle between the start point and the end point of the attack operation, and sending a corresponding determination result to the game server; judging, by the game server, validity of the attack operation of the first client, according to determination results, wherein each of the at least one second client is a client that participates in a same session of a game with the first client.

According to a third aspect of the present disclosure, an information processing method is provided, the method includes receiving, by each of at least one second client, location information corresponding to a start point and an end point of an attack operation sent by a game server, the location information corresponding to the start point and the end point of the attack operation is sent to the game server by a first client, the first client is a client that triggers the attack operation, and each of at least one second client is a client that participates in a same session of a game with the first client: determining, by each of at least one second client, whether there is an obstacle between the start point and the end point of the attack operation, according to the location information corresponding to the start point and the end point of the attack operation: and sending, by each of at least one second client, a corresponding determination result to the game server, and judging, by the game server, validity of the attack operation of the first client, according to determination results.

According to a fourth aspect of the present disclosure, an information processing apparatus is provided, which is applied to a game server, the apparatus includes a receiving module configured to receive an operation message sent by a first client, the operation message carries location information corresponding to a start point and an end point of an attack operation, and the first client is a client that triggers the attack operation; a sending module configured to send the location information corresponding to the start point and the end point of the attack operation to at least one second client, determine whether there is an obstacle between the start point and the end point of the attack operation via each of the at least one second client, and send a corresponding determination result to the game server, wherein each of the at least one second client is a client that participates in a same session of a game with the first client: and a processing module configured to judge validity of the attack operation of the first client according to determination results.

According to a fifth aspect of the present disclosure, an information processing apparatus is provided, which is applied to a first client, the apparatus includes a sending module configured to send an operation message to a game server, wherein the operation message carries location information corresponding to a start point and an end point of an attack operation, the first client is a client that triggers the attack operation: send the location information corresponding to the start point and the end point of the attack operation to at least one second client via the game server, determine whether there is an obstacle between the start point and the end point of the attack operation via each of the at least one second client, and send a corresponding determination result to the game server; judge validity of the attack operation triggered by the first client, by the game server, according to determination results, wherein each of the at least one second client is a client that participates in a same session of a game with the first client.

According to a sixth aspect of the present disclosure, an information processing apparatus is provided, which is applied to each of at least one second client, the apparatus includes a receiving module configured to receive location information corresponding to a start point and an end point of an attack operation sent by a game server, the location information corresponding to the start point and the end point of the attack operation is sent to the game server by a first client, the first client is a client that triggers the attack operation, and each of the at least one second client is a client that participates in a same session of a game with the first client: a processing module configured to determine whether there is an obstacle between the start point and the end point of the attack operation, according to the location information corresponding to the start point and the end point of the attack operation: and a sending module configured to send a corresponding determination result to the game server, and judge validity of the attack operation of the first client, by the game server, according to one or more determination results.

According to a seventh aspect of the present disclosure, an information processing device is provided, the information processing device includes: a processor: and a memory device storing program instructions; when the program instructions are executed by the processor, the information processing device is caused to implement the method according to the first aspect of the present disclosure.

According to a eighth aspect of the present disclosure, a computer-readable storage medium is provided, on which a computer program is stored, and when the computer program is executed by a processor, the method according to the first aspect is implemented.

The above general description and the following detailed description are intended to be illustrative explanatory and and not restrictive.

BRIEF DESCRIPTION OF THE DRAWINGS

In order to more clearly explain the technical solutions in the embodiments of the present disclosure or the prior art, the following will briefly introduce the drawings that need to be used in the description of the embodiments or the prior art. Obviously, the drawings in the following description are only some embodiments of the present disclosure. For those of ordinary skill in the art, without paying any creative work, other drawings can also be obtained based on these drawings, wherein.

DETAILED DESCRIPTION

Figure 1:
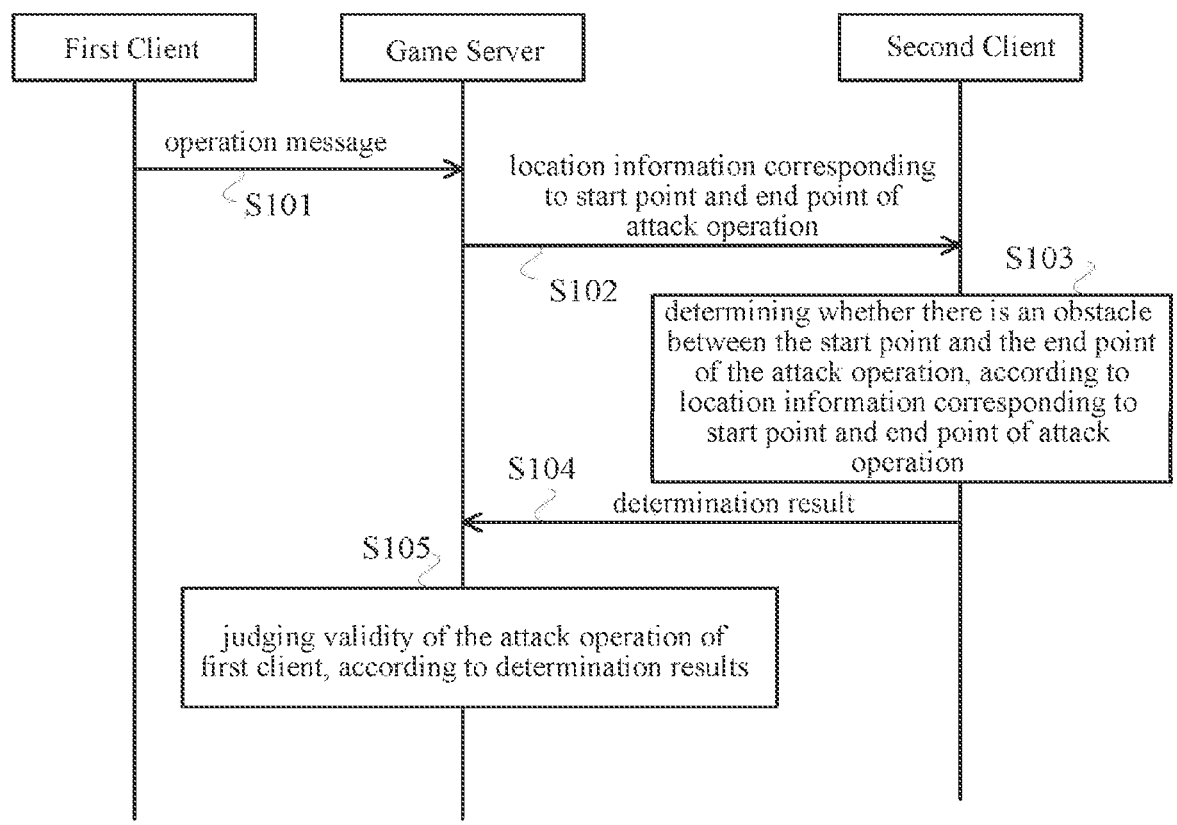
FIG. 1 is a signaling interaction diagram of an information processing method provided by an embodiment of the disclosure.

In order to make the purpose, technical solutions and advantages of the embodiments of the present disclosure clearer, the technical solutions in the embodiments of the present disclosure will be described below in conjunction with the drawings in the embodiments of the present disclosure. Obviously, the described embodiments are parts of the present disclosure, but not all embodiments. Based on the embodiments in the present disclosure, all other embodiments obtained by those of ordinary skill in the art without creative work shall fall within the protection scope of the present disclosure.

It should be noted that the terms "first" and "second" in each part of the embodiments of the present disclosure and the drawings are used to distinguish similar objects, and not necessarily used to describe a specific sequence or order. It should be understood that the data used in this way can be interchanged under appropriate circumstances so that the embodiments of the present disclosure described herein can be implemented in a sequence other than those illustrated or described herein. In addition, the terms "including" and "having" and any variations of them are intended to cover non-exclusive inclusions. For example, a process, method, system, product or device that includes a series of steps or units is not necessarily limited to those clearly listed steps or units, but may include other steps or units that are not clearly listed or are inherent to these processes, methods, products, or equipment.

The method flowcharts involved in the following embodiments of the present disclosure are only exemplary descriptions, and do not necessarily include all the content and steps, nor do they have to be executed in the described order. For example, some steps can be decomposed, and some steps can be combined or partially combined. Therefore, the actual execution order can be changed according to actual conditions.

The functional modules in the block diagrams involved in the following embodiments of the present disclosure are merely functional entities, and do not necessarily correspond to physically independent entities. That is, these functional entities may be implemented in the form of software, or implemented in one or more hardware modules or integrated circuits, or implemented in different networks and/or processors and/or microcontrollers.

The existing procedure for determining validity of operations is to directly verify the validity of client's operations by using a game server. For example, in the above example, when player A attacks player B, a client where player A is located sends attack information to the game server, and the game server uses a physical map stored by itself to judge whether player A can attack player B. If player A can attack player B, it means that the client where player A is located uses a tag-on service when performing this attack, so this attack is an invalid operation; if player A can't attack player B, it means that the client where player A is located does not use a tag-on service when performing this attack, and this attack is an effective operation. A disadvantage of this prior art is that for each attack, the game server needs to use the physical map stored in itself to determine whether player A can attack player B, so as to determine validity of the attack operation, resulting in excessive load on the game server.

An information processing method, apparatus, and storage medium provided by the embodiments of the present disclosure will be described with reference to multiple examples as follows.

FIG. 1 is a signaling interaction diagram of an information processing method provided by an embodiment of the disclosure. The information processing method can be implemented by one or more processing device (such as a processor) of game servers and clients executing one or more corresponding software codes or by one or more processing device of game servers and clients executing corresponding software codes and combining with other hardware entities. For example, the clients include a first client and a second client, and the second client and the first client take part in a same session of a game. Among them, the client is, for example, a device capable of running online games, such as a mobile phone or a tablet, and the game server may be a server, or a server cluster composed of several servers, or a cloud computing service center, and so on.

It should be noted that the first client and the second client in the embodiments of the present disclosure are relative. For example, player A, player B. and player C participate in a certain session of a online game. When player A attacks player B, the client where player A is located is a first client, and the client where player B and player C are located is a second client. When player C attacks player A, the client where player C is located is a first client, and the client where player A and player B are located is a second client. Among them, the number of second clients is not limited in the embodiment of the present disclosure, and can be specifically determined according to a type of the game or according to the number of clients participating in the game.

As shown in FIG. 1, the information processing method shown in this embodiment includes the following steps.

At a step S101, an operation message sent by a first client is received by a game server.

Wherein, the operation message carries location information corresponding to a start point and an end point of an attack operation. The first client is a client that triggered the attack operation.

For example, during a online game, when player A attacks player B, the first client where player A is located sends the operation message to the game server. For example, in a 3D game scene, location information corresponding to the start point of the attack operation can be a three-dimensional coordinate containing coordinate values of three coordinate axes x, y, and z, which representing a point in space. Location information corresponding to the end point of the attack operation can also be a point in space, that is, a position where the attack is on a body of player B.

At a step S102, location information corresponding to the start point and the end point of the attack operation is sent to at least one second client by the game server.

Correspondingly, each of the at least one second client receives the location information corresponding to the start point and the end point of the attack operation sent by the game server.

At a step S103, whether there is an obstacle between the start point and the end point of the attack operation is determined by the second client, according to the location information corresponding to the start point and the end point of the attack operation.

For example, the second client performs simulation calculations according to the location information corresponding to the start point and the end point of the attack operation, and determines whether there have one or more obstacles between the start point and the end point of the attack operation. If the second client determines that there have one or more obstacles between the start point and end point of the attack operation, it means that this attack operation is not allowed, i.e. illegal, since 'shooting through the wall' in the online game world is an unreasonable operation, thereby no damage to player B should be caused by this attack operation. Furthermore, if the second client determines that there is no obstacle between the start point and the end point of the attack operation, it means that this attack operation is legal and validity, that is, this attack operation should cause damage to player B.

At a step S104, a determination result is sent to the game server by each of the second clients.

It can be understood that the number of determination results is less than or equal to the number of second clients in this session of the game. For example, regardless of the determination results that there is an obstacle and/or there is no obstacle between the start point and the end point of the attack operation determined by at least one second client, all these determination results are sent to the game server. Alternatively, only when a second client determines that there is an obstacle between the start point and the end point of the attack operation, a corresponding determination result is sent to the game server. Alternatively, only when a second client determines that there is no obstacle between the start point and the end point of the attack operation, a corresponding determination result is sent to the game server, etc. The specific settings can be set according to requirements, and this embodiment is not limited to this.

Correspondingly, the game server receives the determination results sent by the at least one second client.

At a step S105, validity of the attack operation of the first client is judged by the game server according to the determination results.

Since the determination results can have different functions as described in step S104, this step can also be implemented by a plurality of implementation manners, which will be illustrated below with examples.

In a first implementation manner, this step may include: gathering, by the game server, statistics on the number of second clients that have sent a determination result that there is an obstacle between the start point and the end point of the attack operation, and in the case of the number is greater than or equal to a threshold, judging that the attack operation of the first client is invalid: and in the case of the number is less than the threshold, judging that the attack operation of the first client is valid. For example, there are 10 second clients participating in the same session of the online game, and the game server sends corresponding information about the attack operation to these 10 second clients. After that, in the case of that 5 of the second clients feedback a determination result that there is an obstacle between the start point and the end point of the attack operation and the threshold is 5, it can be determined that the first client uses a tag-on service when performing the attack operation. In the case of that the threshold is still 5, when the game server only receives feedback from two second clients that there is an obstacle between the start point and the end point of the attack operation, then the game server judges that the attack operation is a valid operation since the number of samples is too small.

Those skilled in the art can understand that the determination result in this implementation manner is used to indicate that there is an obstacle between the start point and the end point of the attack operation. That is, the second client only sends the determination result to the game server when it determines that there is an obstacle between the start point and the end point of the attack operation, otherwise the second client does not send the determination result.

In the second implementation manner, this step may include: gathering, by the game server, statistics on determination results sent by the at least one second client, and judging the validity of the attack operation of the first client according to statistical results. Those skilled in the art can understand that the determination result in this implementation manner can be used to indicate presence or absence of one or more obstacles between the start point and the end point of the attack operation.

For example, in this embodiment, if the second client sends the determination result to the game server only when determining that there is an obstacle between the start point and the end point of the attack operation, then in the case of the number of determination results is greater than or equal to a first threshold, the game server judges that the attack operation of the first client is invalid; otherwise, it is determined that the attack operation of the first client is valid.

Alternatively, if the second client terminal sends the determination result to the game server only when determining that there is no obstacle between the start point and the end point of the attack operation, then in the case of the number of determination results is greater than or equal to a second threshold, the game server judges that the attack operation of the first client is valid; otherwise, it is determined that the attack operation of the first client is invalid.

Alternatively, regardless of the determination result sent by the second client is that there is an obstacle between the starting and ending of the attack operation or there is no obstacle between the starting and ending of the attack operation, the determination result (i.e. presence of the obstacle or absence of the obstacle) is sent to the game server, and statistics on the determination result of presence or absence of the obstacle are separately gathered by the game server, and when the number of determination result for the presence of obstacle is greater than the number of determination results for the absence of obstacle, the game server judges that the attack operation of the first client is invalid: when the number of determination result for the presence of obstacle is less than or equal to the number of determination results for the absence of obstacle, the attack operation of the first client is judged as valid, and so on. Furthermore, the threshold, the first threshold and the second threshold mentioned above may be the same or different, and can be specifically set according to actual requirements.

According to the embodiment of the present disclosure, the game server receives an operation message sent by the first client, and the operation message carries location information corresponding to a start point and an end point of an attack operation. The first client is a client that triggers the attack operation. After that, the location information corresponding to the start point and the end point of the attack operation is sent to at least one second client by the game server, and each of the at least one second client determines whether there is an obstacle between the start point and the end point of the attack operation, and sends a corresponding determination result to the game server. Each of the at least one second client is a client that participates in the same session of the game with the first client. Finally, the game server judges validity of the attack operation of the first client according to the determination result. Since the operation of determining whether there is an obstacle between the start point and the end point of the attack operation is performed by each of the at least one second client, overhead of the server can be reduced.

Regarding the threshold, it can be understood that the second client determines whether there is an obstacle between the start point and the end point of the attack operation according to the location information corresponding to the start point and the end point of the attack operation, i.e., determining whether the current attack operation is valid. It is equivalent to the second client voting on whether the current attack operation is valid, and the game server judges validity of the attack operation of the first client according to the voting result (determination result) of the second client. For example, each time the game server receives a determination result reported by a second client, make an error counter increment by one. The error counter is used to gather statistics on the number of second clients that sent a determination result and initial value thereof is 0, wherein the determination result is used to indicate that there is an obstacle between the start point and end point of the attack operation.

Figure 2:
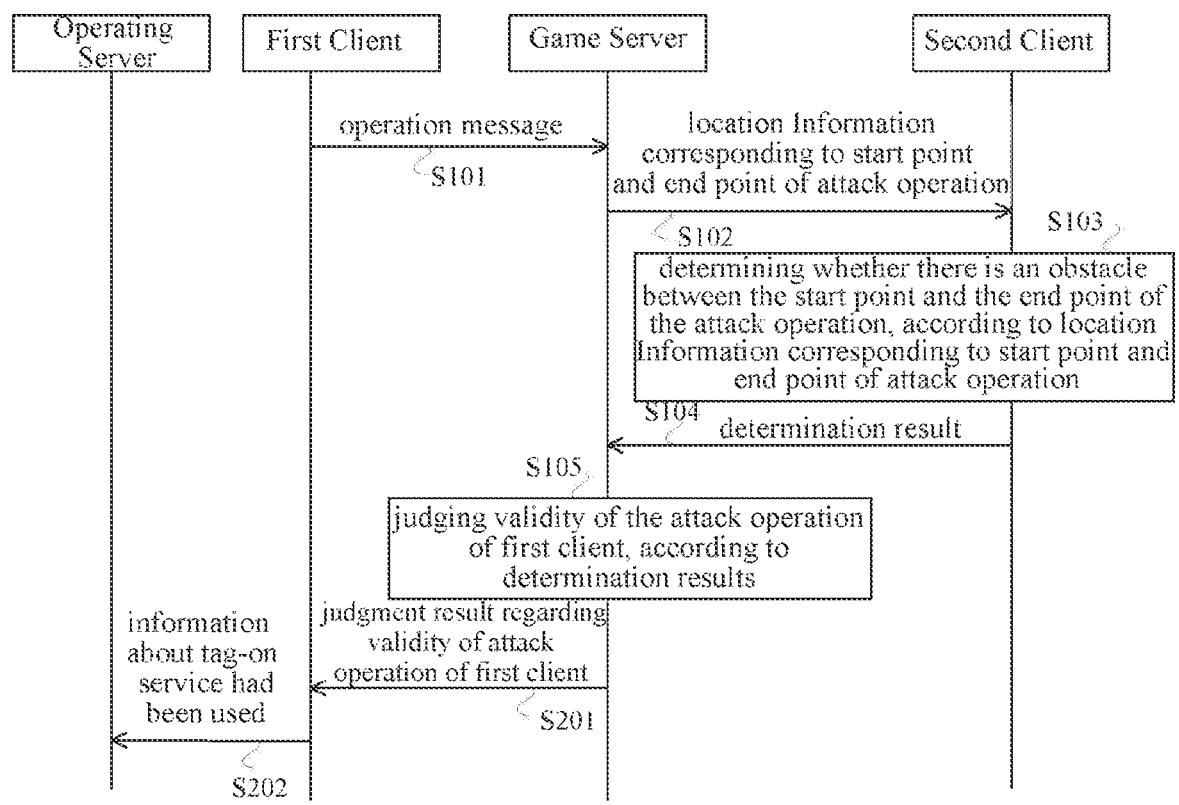
FIG. 2 is a signaling interaction diagram of an information processing method provided by another embodiment of the present disclosure.

FIG. 2 is a signaling interaction diagram of an information processing method provided by another embodiment of the present disclosure. As shown in FIG. 2, based on the process shown in FIG. 1, furthermore, after the step S105, i.e., after determining, by the game server, the validity of the attack operation of the first client, according to the determination results, the information processing method may further include the following steps.

At a step S201, a judgment result of the validity of the attack operation of the first client is sent to the first client by the game server.

Correspondingly, the first client receives the judgment result regarding the validity of the attack operation of the first client sent by the game server.

If the attack operation of the first client is invalid, a step S202 is performed; otherwise if the attack operation of the first client is valid, the process ends.

At the step S202, it is determined that the first client uses a tag-on service and corresponding information is sent to an operating server Optionally, in the case of the attack operation of the first client is invalid, the first client is judged as using the tag-on service, and the first client takes a screenshot of this to retain an evidence, and sends the information that it uses the tag-on service to the operating server, so as to enable the operating server to perform an operating management, for example, locking out a account or prohibiting a matching with clients that other players are located, etc.

In this embodiment, in the case of the attack operation of the first client is invalid and it is judged that a tag-on service is used, the first client sends the information that it uses the tag-on service to the operating server, so as to enable the operating server to perform an operating management, so as to realize processing of the tag-on service in the online game and ensure the fairness of the online game.

In the above embodiment, from the perspective of the first client, the steps performed may include: sending, by a first client, an operation message to a game server, wherein the operation message carries location information corresponding to a start point and an end point of an attack operation, the first client is a client that triggers the attack operation; sending, by the game server, the location information corresponding to the start point and the end point of the attack operation to at least one second client: determining, by each of the at least one second client, whether there is an obstacle between the start point and the end point of the attack operation, and sending a corresponding determination result to the game server; judging, by the game server, validity of the attack operation of the first client, according to determination results, wherein each of the at least one second client is a client that participates in a same session of a game with the first client.

Optionally, after the first client sending the operation message to the game server, the information processing method may further include: receiving, by the first client, a judging result sent by the game server regarding the validity of the attack operation of the first client: in the case of the attack operation is judged as invalid, it is judged that the first client uses a tag-on service, and sending corresponding information to an operating server.

The first client perspective described in this embodiment can be used to implement the technical solutions executed by the first client perspective in the corresponding method embodiments described above, and their implementation principles and technical effects are similar, and will not be repeated here.

In addition, from the perspective of the second client, the steps performed may include: receiving, by each of one or more second clients, location information corresponding to a start point and an end point of an attack operation sent by a game server, the location information corresponding to the start point and the end point of the attack operation is sent to the game server by a first client, the first client is a client that triggers the attack operation, and each of the one or more second clients is a client that participates in a same session of a game with the first client: determining, by each of the one or more second clients, whether there is an obstacle between the start point and the end point of the attack operation, according to the location information corresponding to the start point and the end point of the attack operation: and sending, by each of the one or more second clients, a corresponding determination result to the game server, and judging, by the game server, validity of the attack operation of the first client, according to determination results.

The second client perspective described in this embodiment can be used to implement the technical solutions executed by the second client perspective in the corresponding method embodiments described above, and their implementation principles and technical effects are similar, and will not be repeated here.

The following are apparatus embodiments of the present disclosure, which can be used to implement the foregoing method embodiments of the present disclosure, and their implementation principles and technical effects are similar.

Figure 3:
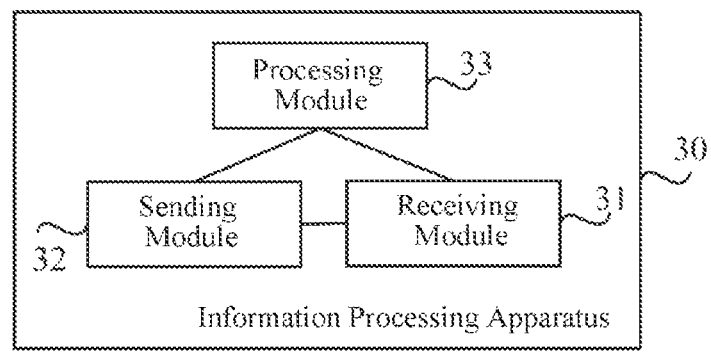
FIG. 3 is a schematic structural diagram of an information processing apparatus provided by an embodiment of the disclosure.

FIG. 3 is a schematic structural diagram of an information processing apparatus provided by an embodiment of the disclosure. The embodiment of the present disclosure provides an information processing apparatus, which is applied to a game server. As shown in FIG. 3, the information processing apparatus 30 of this embodiment may include a receiving module 31, a sending module 32, and a processing module 33.

The receiving module 31 is configured to receive an operation message sent by a first client, the operation message carries location information corresponding to a start point and an end point of an attack operation, and the first client is a client that triggers the attack operation.

The sending module 32 is configured to send the location information corresponding to the start point and the end point of the attack operation to at least one second client, determine whether there is an obstacle between the start point and the end point of the attack operation via each of the at least one second client, and send a corresponding determination result to the game server, wherein each of the at least one second client is a client that participates in a same session of a game with the first client.

The processing module 33 is configured to judge validity of the attack operation of the first client according to determination results.

Optionally, the sending module 32 may also be configured to send the judgment result regarding the validity of the attack operation of the first client to the first client, and in the case of the attack operation is judged as invalid, judge that a tap on service is used by the first client and the information about the tap on service had been used is sent to the operating server.

In some embodiments, for example, the processing module 33 may be configured to perform the following steps: gathering statistics on the number of second clients that have sent a determination result that there is an obstacle between the start point and the end point of the attack operation, and in the case of the number is greater than or equal to a threshold, judging that the attack operation of the first client is invalid: and in the case of the number is less than the threshold, judging that the attack operation of the first client is valid.

Alternatively, the processing module 33 may be configured to perform the following steps: gathering statistics on determination results sent by the at least one second client, and judging the validity of the attack operation of the first client according to statistical results.

Furthermore, the operation message mentioned above may also carry the threshold.

The information processing apparatus described in this embodiment can be used to perform the technical solutions executed by the game server in the above corresponding method embodiments, and their implementation principles and technical effects are similar. For the functions of each module, refer to the corresponding descriptions in the method embodiments, and will not be repeated here.

Figure 4:
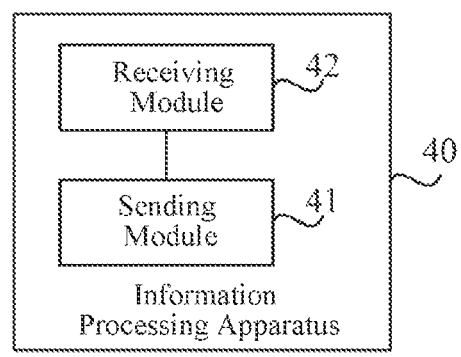
FIG. 4 is a schematic structural diagram of an information processing apparatus provided by another embodiment of the disclosure.

FIG. 4 is a schematic structural diagram of an information processing apparatus provided by another embodiment of the present disclosure. The embodiment of the present disclosure provides an information processing apparatus, which is applied to a first client. As shown in FIG. 4, the information processing apparatus 40 of this embodiment may include a sending module 41.

The sending module 41 is configured to send an operation message to a game server, wherein the operation message carries location information corresponding to a start point and an end point of an attack operation, the first client is a client that triggers the attack operation: send the location information corresponding to the start point and the end point of the attack operation to at least one second client via the game server, determine whether there is an obstacle between the start point and the end point of the attack operation via each of the at least one second client, and send a corresponding determination result to the game server; judge validity of the attack operation triggered by the first client, by the game server, according to determination results, wherein each of the at least one second client is a client that participates in a same session of a game with the first client.

Optionally, the information processing apparatus 40 may further include a receiving module 42. The receiving module 42 may be configured to receive a judgment result sent by the game server regarding validity of the attack operation of the first client.

If the attack operation of the first client is judged as invalid, the sending module 41 may also be configured to judge that the first client uses a tag-on service, and send corresponding information to the operating server.

The information processing apparatus described in this embodiment can be used to perform the technical solutions executed by the first client in the above corresponding method embodiments, and their implementation principles and technical effects are similar. For the functions of each module, refer to the corresponding description of the method embodiments, and this will not repeated here.

Figure 5:
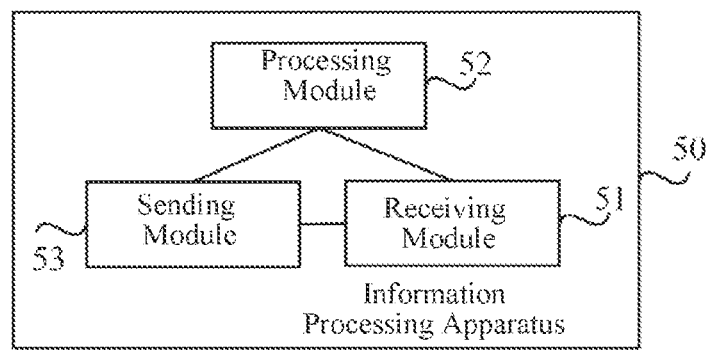
FIG. 5 is a schematic structural diagram of an information processing apparatus provided by another embodiment of the present disclosure.

FIG. 5 is a schematic structural diagram of an information processing apparatus provided by another embodiment of the disclosure. The embodiment of the present disclosure provides an information processing apparatus, which is applied to a second client. As shown in FIG. 5, the information processing apparatus 50 of this embodiment may include a receiving module 51, a processing module 52, and a sending module 53.

The receiving module 51 is configured to receive location information corresponding to a start point and an end point of an attack operation sent by a game server, the location information corresponding to the start point and the end point of the attack operation is sent to the game server by a first client, the first client is a client that triggers the attack operation, and each of one or more second clients is a client that participates in a same session of a game with the first client.

The processing module 52 is configured to determine whether there is an obstacle between the start point and the end point of the attack operation, according to the location information corresponding to the start point and the end point of the attack operation.

The sending module 53 is configured to send a corresponding determination result to the game server, and judge validity of the attack operation of the first client, by the game server, according to one or more determination results.

The information processing apparatus described in this embodiment can be used to execute the technical solutions executed by the second client in the above corresponding method embodiments, and their implementation principles and technical effects are similar. For the functions of each module, refer to corresponding description of the method embodiments, and this will not be repeated here.

Figure 6:
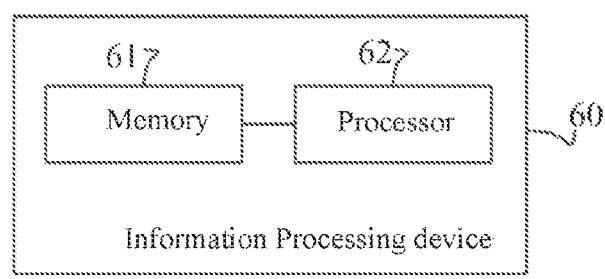
FIG. 6 is a schematic structural diagram of an information processing device provided by another embodiment of the disclosure.

FIG. 6 is a schematic structural diagram of an information processing device provided by another embodiment of the disclosure. As shown in FIG. 6, the information processing device 60 of this embodiment includes a memory 61 and a processor 62. The memory 61 and the processor 62 are connected to each other.

The memory 61 is used to store program instructions.

When the program instructions stored in the memory 61 are executed by the processor 62, the information processing device 60 is caused to execute the method described in any of the foregoing embodiments.

Illustratively, the information processing apparatus 60 may be a game server or a client. For example, the client is a device capable of running games, such as a mobile phone or a tablet. Among them, the game server may be a server, or a server cluster composed of several servers, or a cloud computing service center, and so on.

The embodiments of the present disclosure also provide a computer-readable storage medium on which a computer program is stored, and the computer program can be executed by a processor to implement the method shown in any of the above embodiments. The specific implementation and effective effects can be referred to the description above, and this will not be repeated here.

A person of ordinary skill in the art can understand that all or part of the steps in the foregoing method embodiments can be implemented by hardware relevant to program instructions. The aforementioned computer program can be stored in a computer readable storage medium. When the program is executed, it executes the steps including the foregoing method embodiments; and the foregoing storage medium includes read-only memory (ROM), random access memory (RAM), magnetic disk, optical disc or various media that can store program codes.

Finally, it should be noted that the above embodiments are only used to illustrate the technical solutions of the present disclosure, and it is not intended to limit. Although the present disclosure has been described in detail with reference to the foregoing embodiments, those of ordinary skill in the art should understand that it is possible to modify the technical solutions described in the foregoing embodiments, or equivalently replace some or all of the technical features: and these modifications or replacements do not make the essence of the corresponding technical solutions deviate from the technical solutions of the embodiments of the present disclosure.

What is claimed is:

1. An information processing method, comprising:
receiving, by a game server, an operation message sent by a first client, the operation message carries location information corresponding to a start point and an end point of an attack operation in a game scene of a game, and the first client is a first device that triggers the attack operation in the game;
sending, by the game server, the location information corresponding to the start point and the end point of the attack operation to at least one second client, determining, by the second client according to the location information corresponding to the start point and the end point of the attack operation, whether there is an obstacle between the start point and the end point of the attack operation, and sending, by the second client, a corresponding determination result of whether there is the obstacle between the start point and the end point of the attack operation to the game server, wherein the second client is a second device that participates in a same session of the game with the first client and is a non-attacker client; and
gathering, by the game server, statistics on the determination result sent by the second client, and judging, by the game server according to a result of the gathering of the statistics on the determination result sent by the second client, validity of the attack operation triggered by the first client to determine whether the first client uses a tag-on service when performing the attack operation to reduce overhead of the game server.

2. The method according to claim 1, wherein the method further comprising:
sending, by the game server, a judgment result regarding the validity of the attack operation of the first client to the first client, and in the case of the attack operation is judged as invalid, judging that the first client uses the tag-on service and sending corresponding information to an operating server.

3. The method according to claim 1, wherein the judging, by the game server, validity of the attack operation triggered by the first client comprises:
gathering, by the game server, statistics on a number of second clients that have sent the determination result that there is the obstacle between the start point and the end point of the attack operation, and in the case of the number is greater than or equal to a threshold, judging that the attack operation of the first client is invalid; and in the case of the number is less than the threshold, judging that the attack operation of the first client is valid.

4. The method according to claim 1, wherein the judging, by the game server, validity of the attack operation triggered by the first client comprises:
gathering, by the game server, statistics on the determination results-result sent by the second client, and judging the validity of the attack operation of the first client according to statistical results.

5. An information processing method, comprising:
sending, by a first client, an operation message to a game server, wherein the operation message carries location information corresponding to a start point and an end point of an attack operation in a game scene of a game, the first client is a first device that triggers the attack operation in the game;
sending, by the game server, the location information corresponding to the start point and the end point of the attack operation to at least one second client;
determining, by the second client according to the location information corresponding to the start point and the end point of the attack operation, whether there is an obstacle between the start point and the end point of the attack operation, and sending, by the second client, a corresponding determination result of whether there is the obstacle between the start point and the end point of the attack operation to the game server;
gathering, by the game server, statistics on the determination result sent by the second client, and judging, by the game server according to a result of the gathering of the statistics on the determination result sent by the second client, validity of the attack operation of the first client to determine whether the first client uses a tag-on service when performing the attack operation to reduce overhead of the game server,
wherein the second client is a second device that participates in a same session of the game with the first client and is a non-attacker client.

6. The method according to claim 5, wherein after sending, by the first client, the operation message to the game server, the method further comprising:
receiving, by the first client, a judging result sent by the game server regarding the validity of the attack operation of the first client;
in the case of the attack operation is judged as invalid, it is determined that the first client uses the tag-on service, and the first client sends corresponding information to an operating server.

7. An information processing method, comprising:
receiving, by at least one second client, location information corresponding to a start point and an end point of an attack operation in a game scene of a game sent by a game server, the location information corresponding to the start point and the end point of the attack operation is sent to the game server by a first client, the first client is a first device that triggers the attack operation in the game, and the second client is a second device that participates in a same session of the game with the first client and is a non-attacker client;
determining, by the second client, whether there is an obstacle between the start point and the end point of the attack operation, according to the location information corresponding to the start point and the end point of the attack operation; and
sending, by the second client, a corresponding determination result of whether there is the obstacle between the start point and the end point of the attack operation to the game server, gathering, by the game server, statistics on the determination result sent by the second client, and judging, by the game server according to a result of the gathering of the statistics on the determination result sent by the second client, validity of the attack operation of the first client to determine whether the first client uses a tag-on service when performing the attack operation to reduce overhead of the game server.

8. The method according to claim 2, wherein the judging that the first client uses the tag-on service and sending corresponding information to the operating server comprises:
informing the first client of taking a screenshot to retain an evidence and sending information that the first client uses the tag-on service to the operating server, in the case of judging that the first client uses the tag-on service.

9. The method according to claim 1, the determining, by second client, whether there is the obstacle between the start point and the end point of the attack operation comprises:
performing, by the second client, a simulation calculation, according to the location information corresponding to the start point and the end point of the attack operation, and determining whether there is the obstacle between the start point and the end point of the attack operation.

10. The method according to claim 1, wherein the number of determination results is less than or equal to the number of second clients in the session of the game.

11. The method according to claim 5, the determining, by each of the second client, whether there is the obstacle between the start point and the end point of the attack operation comprises:
performing, by the second client, a simulation calculation, according to the location information corresponding to the start point and the end point of the attack operation, and determining whether there is the obstacle between the start point and the end point of the attack operation.

12. The method according to claim 5, wherein the number of determination results is less than or equal to the number of second clients in the session of the game.

13. The method according to claim 6, the judging that the first client uses the tag-on service, and sending, by the first client, the corresponding information to the operating server comprises:
taking a screenshot to retain an evidence and sending information that the first client uses the tag-on service to the operating server, by the first client, in the case of judging that the first client uses the tag-on service.

14. The method according to claim 7, wherein the determining, by the second client, whether there is the obstacle between the start point and the end point of the attack operation, according to the location information corresponding to the start point and the end point of the attack operation comprises:
performing, by the second client, a simulation calculation, according to the location information corresponding to the start point and the end point of the attack operation, and determining whether there is the obstacle between the start point and the end point of the attack operation.

15. The method according to claim 7, wherein the number of determination results is less than or equal to the number of second clients in the session of the game.

\* \* \* \* \*